US012771602B2

(12) United States Patent
Wang et al.

(10) Patent No.: US 12,771,602 B2
(45) Date of Patent: Oct. 20, 2026

(54) METHOD OF DISPLAYING INFORMATION FOR CONTENT DELIVERY NETWORK

(71) Applicant: BEIJING BAIDU NETCOM SCIENCE TECHNOLOGY CO., LTD., Haidian District (CN)

(72) Inventors: Chao Wang, Beijing (CN); Yunyang Zhao, Beijing (CN); Yan Gao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 113 days.

(21) Appl. No.: 18/748,176

(22) Filed: Jun. 20, 2024

(65) Prior Publication Data

US 2025/0023781 A1 Jan. 16, 2025

(30) Foreign Application Priority Data

Dec. 12, 2023 (CN) ........................ 202311704816.8

(51) Int. Cl.

| | |
|---|---|
| ***G06F 16/957*** | (2019.01) |
| ***G06F 15/16*** | (2006.01) |
| ***G06F 16/958*** | (2019.01) |
| ***H04L 9/40*** | (2022.01) |
| ***H04L 12/26*** | (2006.01) |

(Continued)

(52) U.S. Cl.
CPC .......... *H04L 41/0853* (2013.01); *H04L 41/22* (2013.01); *H04L 63/1425* (2013.01)

(58) Field of Classification Search
CPC . H04L 41/0853; H04L 41/22; H04L 63/1425; H04L 41/084
See application file for complete search history.

(56) References Cited

U.S. PATENT DOCUMENTS

2006/0092851 A1* 5/2006 Edlund ............... H04L 43/0876 370/252
2006/0200538 A1* 9/2006 Yuh ...................... G06F 15/177 709/219

(Continued)

FOREIGN PATENT DOCUMENTS

CN 109067813 A * 12/2018 ............. H04L 63/20
CN 111555983 A * 8/2020 ............. H04L 45/16

(Continued)

*Primary Examiner* — Umar Cheema
*Assistant Examiner* — Golam Mahmud
(74) *Attorney, Agent, or Firm* — Pillsbury Winthrop Shaw Pittman, LLP

(57) ABSTRACT

A content delivery network-oriented method of displaying an information is provided, which may be applied to a field of Internet technology, and in particular to a field of content delivery network technology. The method includes: acquiring a business configuration information in response to a detection that a configuration control on a display page is triggered, where the business configuration information includes a business domain name and a configuration parameter; acquiring a task information in response to an operation for an abnormal resource information being detected, where the abnormal resource information is determined according to the business domain name and the configuration parameter; and displaying a processing result for the abnormal resource information according to the task information.

20 Claims, 8 Drawing Sheets

700B

(51) Int. Cl.

| | |
|---|---|
| ***H04L 29/06*** | (2006.01) |
| ***H04L 29/08*** | (2006.01) |
| ***H04L 41/0853*** | (2022.01) |
| ***H04L 41/22*** | (2022.01) |

(56) References Cited

U.S. PATENT DOCUMENTS

| | | | | |
|---|---|---|---|---|
| 2015/0127765 | A1* | 5/2015 | Bergman | H04L 61/4511 709/213 |
| 2023/0327942 | A1* | 10/2023 | Zhao | H04L 41/22 709/224 |
| 2024/0243967 | A1* | 7/2024 | Singh | H04L 41/0806 |
| 2025/0150477 | A1* | 5/2025 | Nagatani | H04L 63/1416 |

FOREIGN PATENT DOCUMENTS

| | | | | | |
|---|---|---|---|---|---|
| CN | 111600772 | B | * | 5/2022 | H04L 67/63 |
| CN | 114615276 | A | * | 6/2022 | H04L 67/60 |
| CN | 116628372 | A | * | 8/2023 | G06F 16/9574 |
| CN | 117076795 | A | * | 11/2023 | G06F 16/9538 |
| CN | 117714287 | A | * | 3/2024 | H04L 41/22 |
| WO | WO-2020024926 | A1 | * | 2/2020 | H04W 72/20 |
| WO | WO-2024188325 | A1 | * | 9/2024 | G06F 9/451 |

* cited by examiner

METHOD OF DISPLAYING INFORMATION FOR CONTENT DELIVERY NETWORK

CROSS-REFERENCE TO RELATED APPLICATION(S)

This application claims priority to Chinese Patent Application No. 202311704816.8 filed on Dec. 12, 2023, the content of which is incorporated herein by reference in its entirety.

TECHNICAL FIELD

The present disclosure relates to a field of Internet technology, and in particular to a field of content delivery network technology. Specifically, the present disclosure relates to a content delivery network-oriented method of displaying an information.

BACKGROUND

Content delivery network (CDN) refers to an intelligent virtual network built on the basis of existing networks. By relying on edge servers deployed in various places, a content delivery network allows users to acquire desired contents nearby, through load balancing, content delivery, scheduling and other functional modules of a central platform.

SUMMARY

The present disclosure provides a content delivery network-oriented method of displaying an information, an electronic device, and a computer-readable storage medium.

According to an aspect of the present disclosure, a method of displaying an information is provided, including: acquiring a business configuration information in response to a detection that a configuration control on a display page is triggered, where the business configuration information includes a business domain name and a configuration parameter; acquiring a task information in response to an operation for an abnormal resource information being detected, where the abnormal resource information is determined according to the business domain name and the configuration parameter; and displaying a processing result for the abnormal resource information according to the task information.

According to another aspect of the present disclosure, an electronic device is provided, including: at least one processor; and a memory communicatively connected to the at least one processor, where the memory stores instructions executable by the at least one processor, and the instructions are configured to, when executed by the at least one processor, cause the at least one processor to implement the method described in the present disclosure.

According to another aspect of the present disclosure, a non-transitory computer-readable storage medium having computer instructions therein is provided, where the computer instructions are configured to cause a computer to implement the method described in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure. In the accompanying drawings.

DETAILED DESCRIPTION OF EMBODIMENTS

Figure 1:
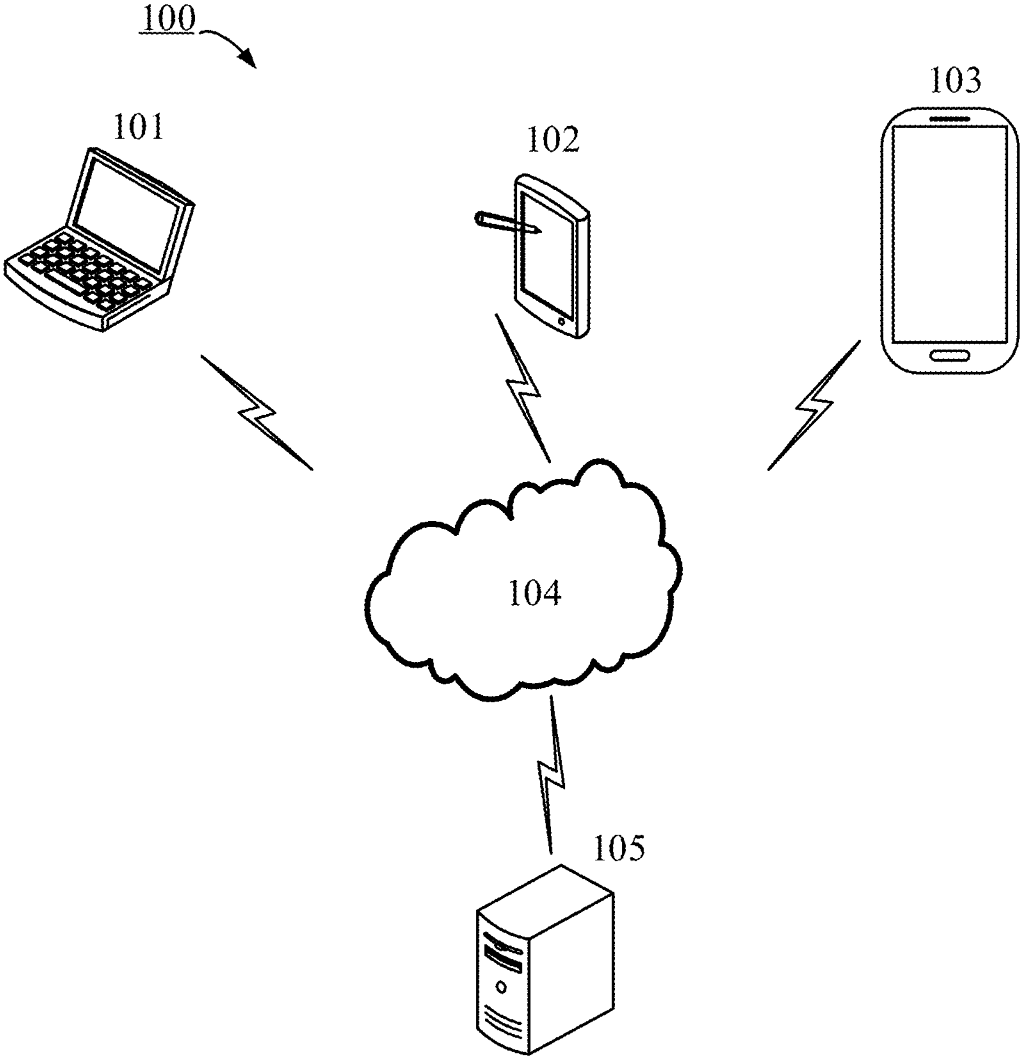
FIG. 1 schematically shows an exemplary system architecture to which a content delivery network-oriented method and apparatus of displaying an information may be applied according to embodiments of the present disclosure.

Exemplary embodiments of the present disclosure will be described below with reference to the accompanying drawings, which include various details of embodiments of the present disclosure to facilitate understanding and should be considered as just exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

With a development of Internet technology, content delivery networks came into being. With node servers placed throughout network, a content delivery network may avoid bottlenecks and links on the Internet that may affect a speed and stability of data transmission, and redirect a user request to a service node closest to the user in real time according to a comprehensive information such as a network traffic, a connection and load status of each node, and a distance and response time from the node to the user.

In a content delivery network, an industrial chain behind dark industries, image hosting thefts and other behaviors may take advantage of loopholes in business architecture or business logic of customers to upload dark industry videos to source sites of customers through source site interfaces of customers and accelerate distribution by accessing domain names through the content delivery network for customers. Such "parasitic" behaviors allow the underlying industry chain to use content delivery network service "for free", resulting in a low utilization of business bandwidth of customers.

In the related art, it is generally to perform an offline run analysis in the background based on analysis scripts, so as to achieve an effect of supporting some special analysis. However, a special analysis based on analysis scripts lacks a full-link capability for monitoring, analyzing and managing dark industry behaviors, and may not ensure an effective control of dark industry behaviors in a scenario of content delivery network. In addition, a special analysis based on analysis scripts does not support a user-defined configuration, and thus may not monitor, analyze and manage dark industry behaviors according to user needs.

To this end, embodiments of the present disclosure propose a content delivery network-oriented solution for displaying an information. For example, a business configuration information may be acquired in response to a detection that a configuration control on a display page is triggered, where the business configuration information includes a business domain name and a configuration parameter. A task information may be acquired in response to an operation for an abnormal resource information being detected, where the abnormal resource information is determined according to the business domain name and the configuration parameter. A processing result for the abnormal resource information may be displayed according to the task information.

According to embodiments of the present disclosure, a business configuration information is acquired through an automatic detection and response to a configuration control trigger event on the display page, an abnormal resource information is determined according to the business configuration information, and a task information is acquired through an automatic detection and response to an operation for the abnormal resource information. The business configuration information and the business information may be acquired without human intervention, thereby ensuring a real-time acquisition of information. On this basis, by displaying the processing result for the abnormal resource information according to the task information, it is possible to effectively process and optimize the abnormal resource, thereby improving a resource utilization. In addition, since a business configuration and an operation configuration may be performed by a user in real time, an abnormal resource may be processed in real time according to user needs, and a processing status of the abnormal resource may be clearly understood, so that user experience may be improved.

In technical solutions of the present disclosure, a collection, a storage, a use, a processing, a transmission, a provision, a disclosure and other processing of user personal information involved comply with provisions of relevant laws and regulations and do not violate public order and good custom.

In the technical solutions of the present disclosure, the acquisition or collection of user personal information has been authorized or allowed by users.

FIG. 1 schematically shows an exemplary system architecture to which a content delivery network-oriented method and apparatus of displaying an information may be applied according to embodiments of the present disclosure.

It should be noted that FIG. 1 is just an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios. For example, in other embodiments, the exemplary system architecture to which a content delivery network-oriented method and apparatus of displaying an information may be applied may include a terminal device, but the terminal device may implement the content delivery network-oriented method and apparatus of displaying the information without interacting with a server.

As shown in FIG. 1, a system architecture 100 according to such embodiments may include terminal devices 101, 102 and 103, a network 104, and a server 105. The network 104 is a medium for providing a communication link between the terminal devices 101, 102, 103 and the server 105. The network 104 may include various connection types, such as wired and/or wireless communication links, etc.

The terminal devices 101, 102 and 103 may be used by a user to interact with the server 105 through the network 104 to receive or send messages, etc. The terminal devices 101, 102 and 103 may be installed with various communication client applications, such as knowledge reading applications, web browser applications, search applications, instant messaging tools, email clients and/or social platform software, etc. (just for example).

The terminal devices 101, 102 and 103 may be various electronic devices having display screens and supporting web browsing, including but not limited to smart phones, tablet computers, laptop computers, and desktop computers, etc.

The terminal devices 101, 102 and 103 may also be various intelligent driving devices that support positioning and navigation functions, including but not limited to smart cars, smart school buses, smart trucks, etc.

The terminal devices 101, 102 and 103 may interact with the server 104 to receive or send positioning information, etc. Intelligent driving devices 101, 102 and 103 may be installed with various client applications that may provide positioning and navigation functions, such as map applications, navigation applications, etc. (just for example).

The server 105 may be various types of servers providing various services. For example, the server 105 may be a cloud server, also known as a cloud computing server or a cloud host, which is a host product in a cloud computing business system to solve shortcomings of difficult management and weak service scalability existing in a conventional physical host and VPS (Virtual Private Server) service. The server 105 may also be a server of a distributed system or a server combined with a block-chain.

It should be noted that the content delivery network-oriented method of displaying the information provided in embodiments of the present disclosure may be generally performed by the terminal device 101, 102 or 103. Accordingly, the content delivery network-oriented apparatus of displaying the information provided in embodiments of the present disclosure may also be arranged in the terminal device 101, 102 or 103.

Alternatively, the content delivery network-oriented method of displaying the information provided in embodiments of the present disclosure may also be generally performed by the server 105. Accordingly, the content delivery network-oriented apparatus of displaying the information provided in embodiments of the present disclosure may be generally arranged in the server 105. The content delivery network-oriented method of displaying the information provided in embodiments of the present disclosure may also be performed by a server or server cluster different from the server 105 and capable of communicating with the terminal devices 101, 102, 103 and/or the server 105. Accordingly, the content delivery network-oriented apparatus of displaying the information provided in embodiments of the present disclosure may also be arranged in a server or server cluster different from the server 105 and capable of communicating with the terminal devices 101, 102, 103 and/or the server 105.

It should be understood that the number of terminal devices, network and server shown in FIG. 1 are just schematic. According to implementation needs, any number of terminal devices, networks and servers may be provided.

Figure 2:
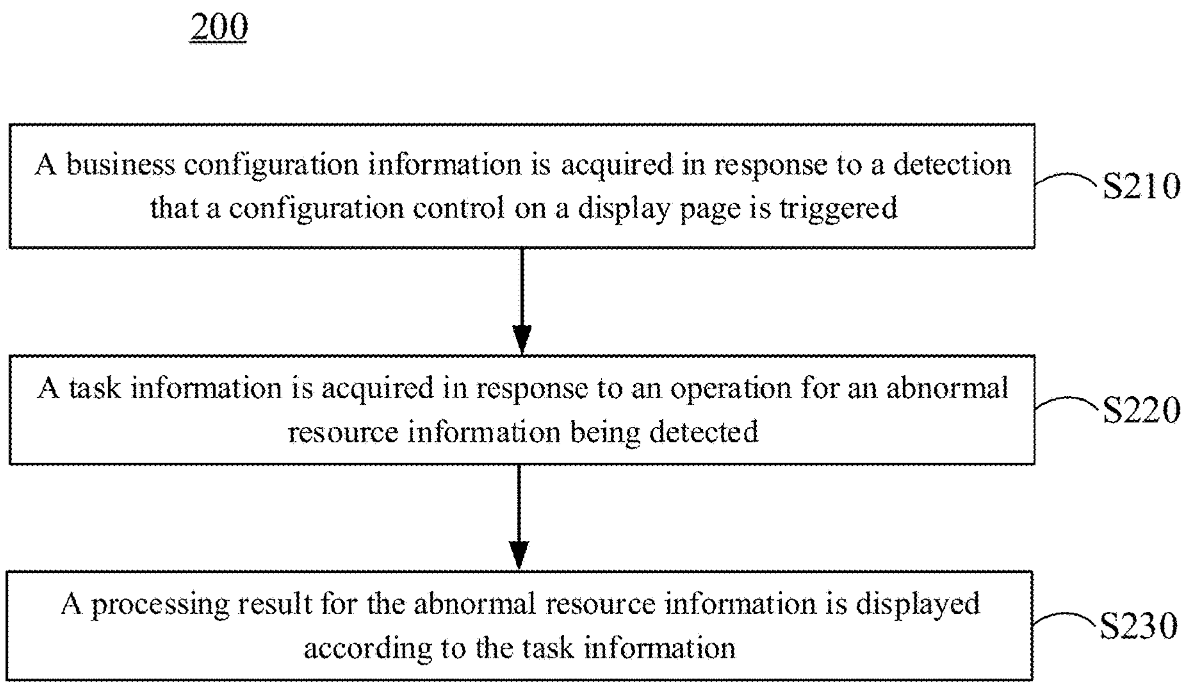
FIG. 2 schematically shows a flowchart of a content delivery network-oriented method of displaying an information according to embodiments of the present disclosure.

FIG. 2 schematically shows a flowchart of a content delivery network-oriented method of displaying an information according to embodiments of the present disclosure.

As shown in FIG. 2, a content delivery network-oriented method 200 of displaying an information may include operation S210 to operation S230.

In operation S210, a business configuration information is acquired in response to a detection that a configuration control on a display page is triggered.

In operation S220, a task information is acquired in response to an operation for an abnormal resource information being detected.

In operation S230, a processing result for the abnormal resource information is displayed according to the task information.

According to embodiments of the present disclosure, the business configuration information includes a business domain name and a configuration parameter. The abnormal resource information is determined according to the business domain name and the configuration parameter.

According to embodiments of the present disclosure, the display page may refer to a page used to provide a display function. The display page may include a configuration control. A control may refer to a visual user interface element in a graphical user interface (GUI), which is used to receive a user input, display an information, and execute an operation, etc. A type of the control may include at least one selected from: a text box, a button, a drop-down list, a menu, a check box, or a radio button, etc. The user is allowed to interact with a program through controls to input commands, manipulate data, and control program behaviors, etc.

According to embodiments of the present disclosure, the configuration control may be used to link to a configuration page. The configuration page may be displayed in response to a detection that the configuration control is triggered. The configuration page may refer to a page used to provide a business configuration function. The configuration page may include a domain name configuration option and a parameter configuration option. For example, the user is allowed to perform a configuration information adding operation on the domain name configuration option to input the business domain name. Alternatively, the user is allowed to perform a configuration information adding operation on the parameter configuration option to input the configuration parameter.

According to embodiments of the present disclosure, the business configuration information may include a business domain name and a configuration parameter. The business domain name may refer to a domain name used to access a specific business system or network service. For example, the business domain name may include an address used to identify and locate a website or network service. The configuration parameter may refer to a parameter that needs to be set for a correct operation and access of the business system or network service. For example, the configuration parameter may include at least one of a function configuration parameter or a threshold configuration parameter, etc.

According to embodiments of the present disclosure, after the business configuration information is obtained, an abnormal resource information may be determined according to the business domain name and the configuration parameter. For example, it is possible to filter a first number of candidate resource information according to one of the business domain name or the configuration parameter to obtain a second number of candidate resource information, and determine the second number of candidate resource information as the abnormal resource information. The second number is less than or equal to the first number. Alternatively, it is possible to filter the first number of candidate resource information according to the business domain name to obtain a third number of candidate resource information, and filter the third number of candidate resource information according to the configuration parameter to obtain a fourth number of candidate resource information. On this basis, the fourth number of candidate resource information may be determined as the abnormal resource information. The fourth number is less than or equal to the third number, and the third number is less than or equal to the first number.

According to embodiments of the present disclosure, after the abnormal resource information is obtained, the abnormal resource information may be displayed on an abnormal resource management page. The abnormal resource management page may refer to a page used to provide an abnormal resource management function. The abnormal resource information may include at least one abnormal resource sub-information corresponding to at least one domain name. The abnormal resource sub-information may include at least one of an abnormal resource address or abnormal resource details. The abnormal resource address may refer to a string used to identify and locate an abnormal resource on the Internet. The abnormal resource details may refer to detailed information corresponding to the abnormal resource.

According to embodiments of the present disclosure, each abnormal resource sub-information may be configured with an operation configuration option. The operation configuration option may be used to configure a management operation type for the abnormal resource sub-information. For example, the user is allowed to perform a configuration information adding operation on the operation configuration option to determine a task configuration information for the abnormal resource sub-information. After the task configuration information respectively corresponding to an arbitrary number of abnormal resource sub-information in the at least one abnormal resource sub-information is obtained, a task information may be determined according to the task configuration information respectively corresponding to the arbitrary number of abnormal resource sub-information.

According to embodiments of the present disclosure, the task information may be used to indicate a type of management operation that needs to be performed on the arbitrary number of abnormal resource sub-information. After the task information is obtained, for each of the arbitrary number of abnormal resource sub-information, it is possible to manage an abnormal sub-resource corresponding to the abnormal resource sub-information according to the management operation type corresponding to the abnormal resource sub-information, so as to obtain a processing sub-result corresponding to the abnormal resource sub-information. On this basis, the processing result may be determined according to the processing sub-result corresponding to each abnormal resource sub-information.

According to embodiments of the present disclosure, the business configuration information is acquired through an automatic detection and response to a configuration control trigger event on the display page, the abnormal resource information is determined according to the business configuration information, and the task information is acquired through an automatic detection and response to an operation for the abnormal resource information. The business configuration information and the task information may be acquired without human intervention, thereby ensuring a real-time acquisition of information. On this basis, by displaying the processing result for the abnormal resource information according to the task information, it is possible to effectively process and optimize the abnormal resource, thereby improving a resource utilization. In addition, the user is allowed to perform a business configuration and an operation configuration in real time, then the abnormal resource may be processed in real time according to user needs, and a processing status of the abnormal resource may be clearly understood, so that user experience may be improved.

The above is just an exemplary embodiment. The present disclosure is not limited thereto, and may further include other content delivery network-oriented methods of displaying information known in the art, as long as it may be implemented to process an abnormal resource in real-time according to user needs in an application scenario of content delivery network.

Figure 3:
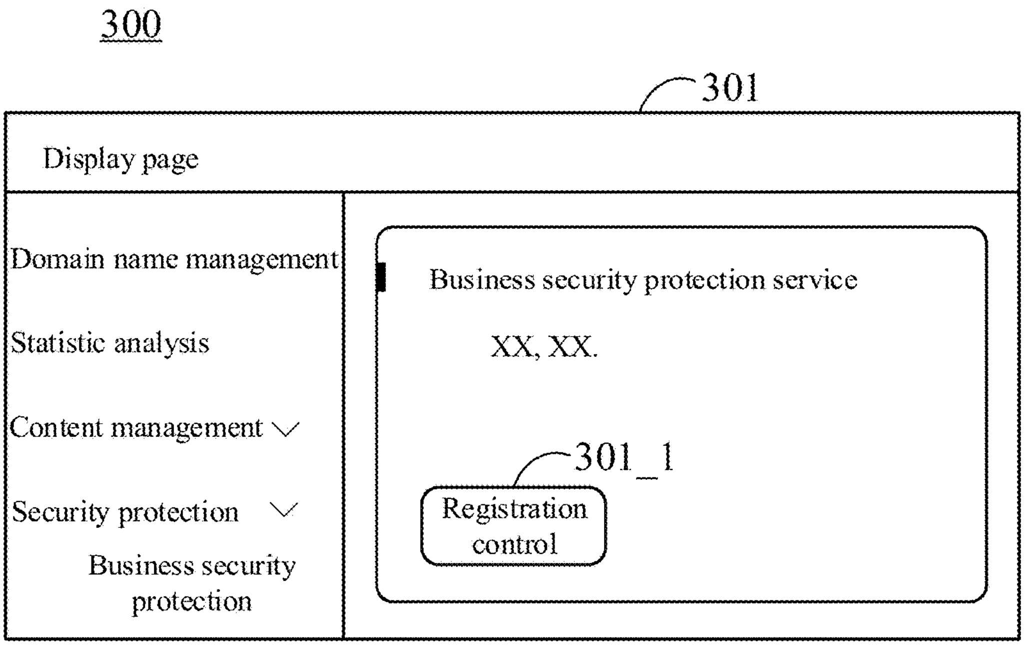
FIG. 3 schematically shows an example schematic diagram of a display page according to embodiments of the present disclosure.

FIG. 3 schematically shows an example schematic diagram of a display page according to embodiments of the present disclosure.

As shown in FIG. 3, the content delivery network-oriented method of displaying the information provided in embodiments of the present disclosure may be applied to a console in a content delivery network. In 300, it is possible to pre-configure an initial design drawing based on user experience (UE), initiate a user experience application according to the initial design drawing to obtain a reviewed design drawing, and design a display page 301 based on the user experience design drawing.

The display page 301 may include a registration control, which may be used to link to a registration page. The registration page may refer to a page used to provide a registration function. In an example, the registration function may refer to a function for activating a business security protection service.

The registration page may be displayed in response to a detection that a registration control 301_1 on the display page 301 is triggered. The user is allowed to enter registration information through the registration page. After the registration information is obtained, the registration information may be verified to obtain a verification result. For example, the registration information may be verified according to a reference information corresponding to the user, so as to obtain the verification result.

For example, when the verification result indicates that the registration information has not passed the verification, that is, the user has not activated the business security protection service, the user may be prohibited from accessing the business security protection service. Alternatively, when the verification result indicates that the registration information has passed the verification, that is, the user has activated the business security protection service, a configuration control may be displayed in an operation column after a domain name list information.

According to embodiments of the present disclosure, by automatically detecting a triggering event of the registration control on the display page and displaying the registration page after a detection of the triggering event, it is possible to achieve an automatic display of the registration page without human intervention. On this basis, by dynamically displaying the configuration control on the display page according to whether the registration information entered on the registration page has passed the verification, it is possible to provide a more convenient registration process and a personalized configuration function, so that user experience and satisfaction may be improved.

Figure 4:
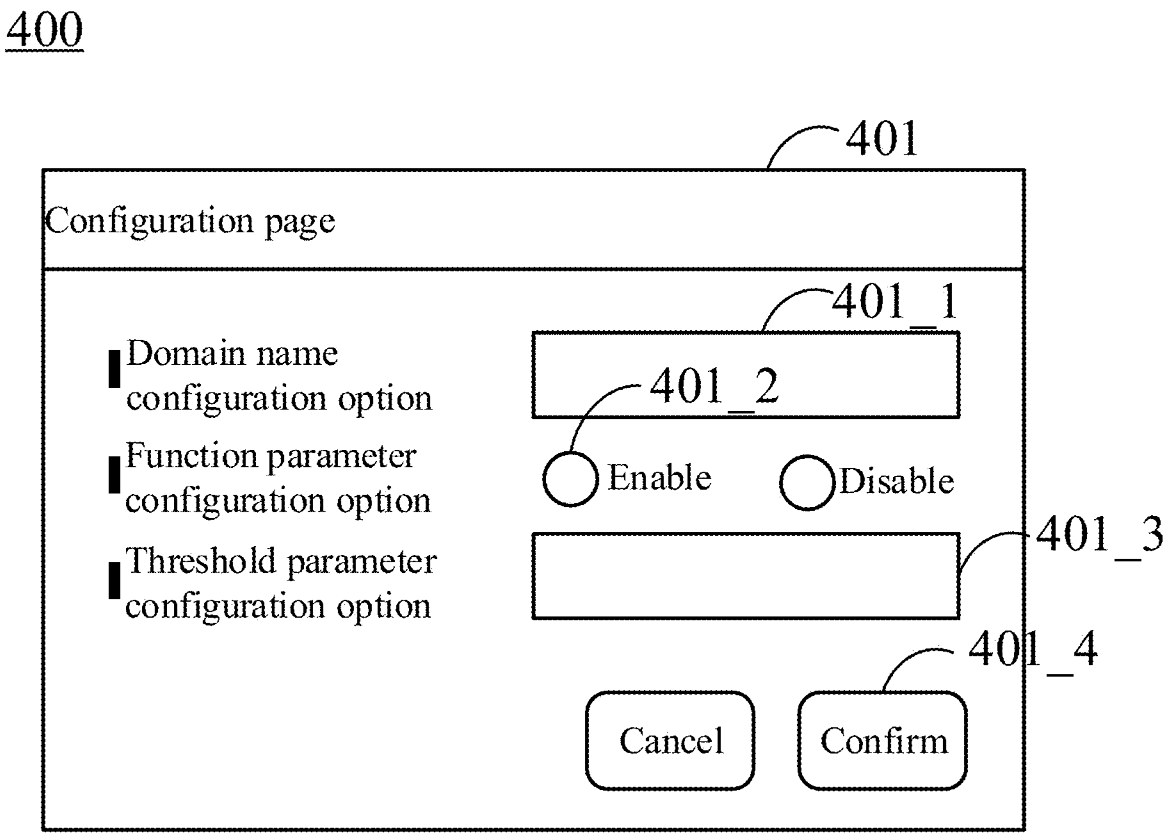
FIG. 4 schematically shows an example schematic diagram of a configuration page according to embodiments of the present disclosure.

FIG. 4 schematically shows an example schematic diagram of a configuration page according to embodiments of the present disclosure.

As shown in FIG. 4, the configuration control may support the user in configuring a detection for a domain name according to actual business needs, that is, in configuring a detection at a domain name level. In response to a detection that the configuration control on the display page is triggered, a configuration page 401 may be displayed, which may include at least one configuration option. The configuration page 401 may be used to issue a domain-level security protection configuration. For example, the configuration option may include at least one of a domain name configuration option or a parameter configuration option, and the parameter configuration option includes at least one of a function parameter configuration option or a threshold parameter configuration option.

In response to a configuration information adding operation for an arbitrary configuration option in the at least one configuration option being detected, the business configuration information may be acquired. For example, in response to an adding operation for the domain name configuration option being detected, the business domain name may be acquired via a domain name input box 401_1. Alternatively, in response to a select operation for an enable button 401_2 corresponding to the function parameter configuration option being detected, it may be determined to enable an inspection function. Alternatively, in response to an adding operation for the threshold parameter configuration option being detected, the threshold parameter may be acquired via a threshold parameter input box 401_3. In an example, the threshold parameter may be used to indicate the number of abnormal resource limits in a single-month inspection.

After the configuration information adding operation for the arbitrary configuration option is completed, it is possible to submit the business configuration information to the console by clicking a confirm button 401_4 on the configuration page 401. Based on an integration of productization capabilities of the above-mentioned daily inspection and user-active configuration of detection, it is possible to integrate relevant capabilities on the configuration page of a front end of the console.

In an embodiment, the configuration page 401 may further include a stock evaluation button. In response to a detection that the stock evaluation button is triggered, a latest related domain name list information of stock business may be refreshed to implement one-click evaluation of stock business. Specifically, it is possible to display a first set of domain names of abnormal resources obtained from the latest round of inspection and a second set of domain names for which a normal detection is enabled. The latest round may refer to a detection result from an application programming interface (API) of Yumenguan inspection corresponding to a historical system time. The historical system time may be determined according to a current system time and a predetermined time threshold. For example, the predetermined time threshold may be 24 hours, and the historical system time may be 24 hours before the current system time.

For the first set of domain names and the second set of domain names, it is possible to detect whether there is a union, i.e., the same domain name, in the two sets. In a case that the first set of domain names and the second set of domain names contain the same domain name, it is possible to remove the domain name corresponding to the same domain name from the first set of domain names, or remove the domain name corresponding to the same domain name from the second set of domain names.

In another embodiment, the configuration parameter may also include at least one selected from: a domain name system (DNS) configuration parameter, a domain name binding configuration parameter, a reverse proxy configuration parameter, or a cache policy configuration parameter. Specifically, the domain name system configuration parameter may be used to resolve the domain name into an Internet Protocol (IP) address of the server to ensure that a user request may be correctly routed to the corresponding server. The domain name binding configuration parameter may be used to associate a business domain name with a specific server or service to ensure that a user request may be correctly forwarded to the corresponding server. The reverse proxy configuration parameter may be used to distribute and forward a request when load balancing or reverse proxy is required. The cache policy configuration parameter may be configured according to specific business needs to improve performance and response speed.

According to embodiments of the present disclosure, through the detection that the configuration control is triggered, the configuration page may be displayed in a timely manner, so that the user may conveniently perform a configuration operation according to actual configuration needs, and a response may be quickly provided to the configuration needs of the user. On this basis, by providing flexible configuration options and supporting precise configurations of different parameters, customizability and applicability of the business configuration information may be improved to meet requirements of different business scenarios.

Figure 5:
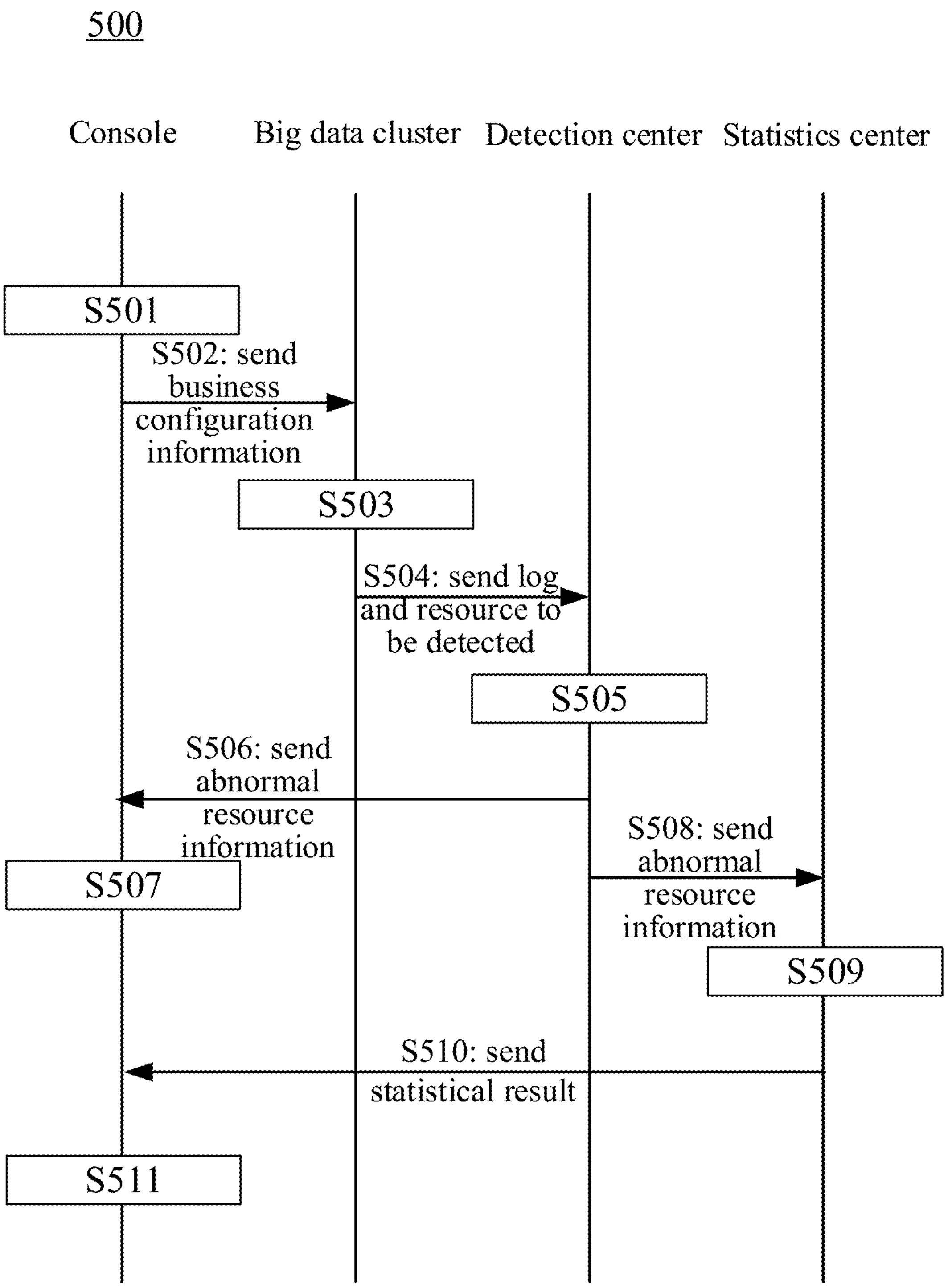
FIG. 5 schematically shows an example schematic diagram of a content delivery network-oriented process of displaying an information according to embodiments of the present disclosure.

FIG. 5 schematically shows an example schematic diagram of a content delivery network-oriented process of displaying an information according to embodiments of the present disclosure.

As shown in FIG. 5, in 500, a content delivery network-oriented process of displaying an information may include operation S501 to operation S511.

In operation S501, the console acquires the business configuration information.

The console may acquire the business configuration information input via the configuration page, so as to distribute the business domain name and the configuration parameter in the business configuration information to at least one target node in the content delivery network.

In an example, by changing an interaction method or usage mode of the front end, the console may have different interaction usage schemes, thereby achieving personalized and differentiated configurations.

In operation S502, the console sends the business configuration information to a big data cluster.

In operation S503, the big data cluster acquires a log to be detected and a resource to be detected according to the business domain name and the configuration parameter.

In an example, the method for acquiring the log to be detected and the resource to be detected may be determined according to actual business needs and is not limited here. The acquisition method may include at least one of a sampling inspection method based on back-to-source log or a sampling inspection method based on access log. The specific number for sampling inspection may be determined according to an inspection threshold. The inspection threshold may be determined according to actual business needs and is not limited here. The inspection threshold may be used to indicate the number of abnormal inspected items in a monthly inspection. For example, the inspection threshold may be 200. In this case, it is possible to extract first 200 logs or randomly extract 200 logs.

For example, the sampling inspection method based on back-to-source log may refer to performing a sampling inspection on the log to be detected by using a multi-line node in a current back-to-source layer. Alternatively, the sampling inspection method based on back-to-source log may also refer to performing a sampling inspection on the log to be detected based on a back-to-source log of an edge node and an intermediate node. In this case, it is possible to add and write a back-to-source log of the node to Kafka, with a medium data volume and a medium adaptation cost. Alternatively, the sampling inspection method based on access log may refer to performing a sampling inspection on the log to be detected based on an edge access log of the user. In this case, it is possible to provide an API interface to download the log, so that the log may be acquired according to the domain name configuration, with a large data volume and a medium adaptation cost.

In another example, an execution subject of acquiring the log to be detected and the resource to be detected may be determined according to actual business needs and is not limited here. The execution subject may include at least one of a content delivery network node in a big data cluster or a data center in a big data cluster. For example, in a case that the log to be detected and the resource to be detected are acquired by a content delivery network node, it is possible to aggregate requests from some network users. Alternatively, in a case that the log to be detected and the resource to be detected are acquired by a data center in a big data cluster, it is possible to aggregate requests from all network users.

In operation S504, the big data cluster sends the log to be detected and the resource to be detected to a detection center.

The detection center may refer to a security service detection center. The detection center may be used to detect the log to be detected and the resource to be detected. The big data cluster may send the log to be detected and the resource to be detected to the security service detection center, so that the security service detection center may subsequently detect the log to be detected and the resource to be detected.

In operation S505, the detection center detects the log to be detected and the resource to be detected to obtain an abnormal resource information.

In operation S506, the detection center sends the abnormal resource information to the console.

In operation S507, the console displays the abnormal resource information on an abnormal resource management page.

In operation S508, the detection center sends the abnormal resource information to a statistics center.

The detection center may send the abnormal resource information to the statistics center so that the statistics center may subsequently performs statistics on the abnormal resource information. The statistics center may be used to perform statistics on the abnormal resource information.

In operation S509, the statistics center performs statistics on the abnormal resource information to obtain a statistical result.

In operation S510, the statistics center sends the statistical result to the console.

After obtaining the statistical result, the statistics center may send the statistical result to the console to support the user in self-service query, download, management or other operations for the abnormal resource on the console.

In operation S511, the console displays the statistical result on the abnormal resource management page.

According to embodiments of the present disclosure, by providing the business domain name and the configuration parameter as inputs, it is possible to accurately acquire the log to be detected and the resource to be detected, so as to ensure that the logs and resources of the business related to the business domain name and the configuration parameter may be included in a detection scope, thereby improving the accuracy and efficiency of the detection. On this basis, by comprehensively detecting the acquired log to be detected and the acquired resource to be detected, it is possible to automatically analyze and visually display an abnormal resource information that may have anomalies, so that the user may intuitively view and analyze the situation of abnormal resources in real time, which may help to further manage and process the abnormal resource, and improve the efficiency and accuracy of abnormal resource management.

Figure 6:
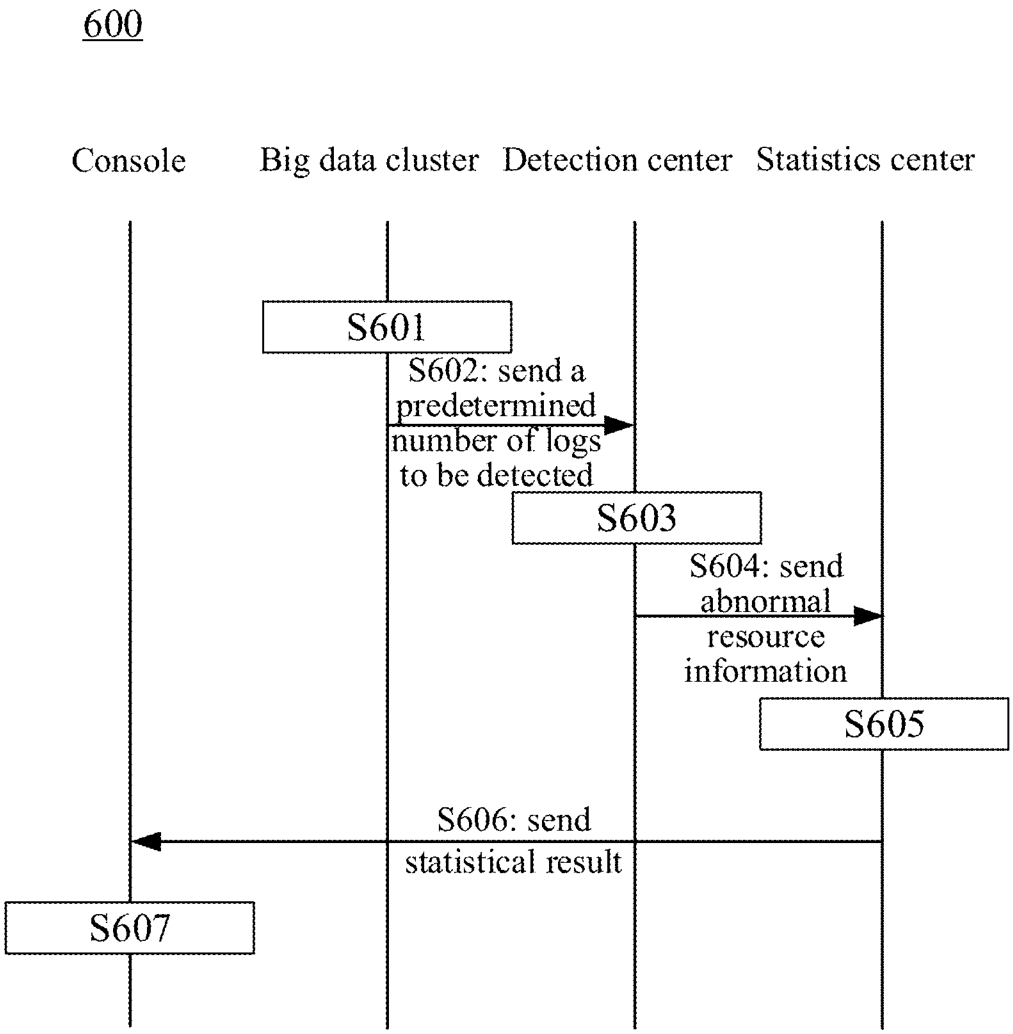
FIG. 6 schematically shows an example schematic diagram of a content delivery network-oriented process of displaying an information according to other embodiments of the present disclosure.

FIG. 6 schematically shows an example schematic diagram of a content delivery network-oriented process of displaying an information according to other embodiments of the present disclosure.

As shown in FIG. 6, in 600, a content delivery network-oriented process of displaying an information is provided, in which a normal sampling inspection is performed by the platform. The content delivery network-oriented process of displaying the information may include operation S601 to operation S607.

In operation S601, the big data cluster may extract a predetermined number of logs to be detected for each domain name from the latest back-to-source station logs of the multi-line nodes every day. The predetermined number may be determined according to actual business needs and is not limited here. For example, the predetermined number may be 10,000.

In operation S602, the big data cluster may send the predetermined number of logs to be detected to a detection center.

In operation S603, the detection center may detect the predetermined number of logs to be detected to obtain an abnormal resource information.

The content delivery network may integrate an API interface of Yumenguan to store detection results of all domain names with volume into a list of abnormal domain names, so as to obtain the abnormal resource information.

In operation S604, the detection center may send the abnormal resource information to the statistics center.

In operation S605, the statistics center may perform statistics on the abnormal resource information to obtain a statistical result.

In operation S606, the statistics center may send the statistical result to the console.

In operation S607, the console may display the statistical result on the abnormal resource management page.

Figure 7A:
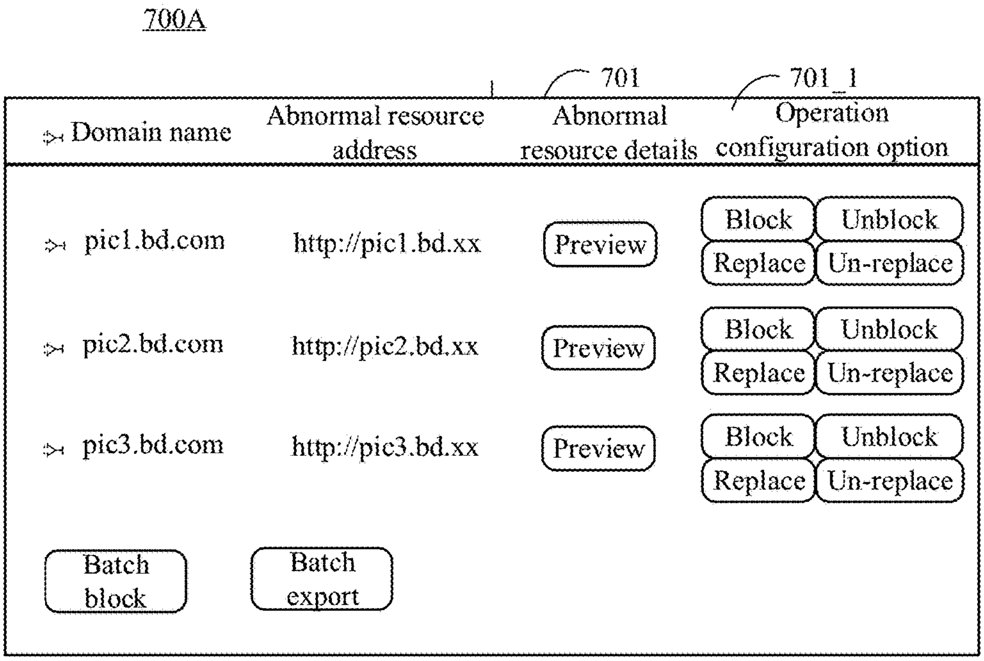
FIG. 7A schematically shows an example schematic diagram of an abnormal resource management page according to embodiments of the present disclosure.

FIG. 7A schematically shows an example schematic diagram of an abnormal resource management page according to embodiments of the present disclosure.

As shown in FIG. 7A, the abnormal resource information may include at least one abnormal resource sub-information respectively corresponding to at least one domain name. In 700A, an abnormal resource management page 701 may include an abnormal resource information display region 701_1. For example, the abnormal resource information may include an abnormal resource sub-information 1 corresponding to a domain name "pic1.bd.com", an abnormal resource sub-information 2 corresponding to a domain name "pic2.bd.com", and an abnormal resource sub-information 3 corresponding to a domain name "pic3.bd.com".

In an example, each abnormal resource sub-information may be configured with an operation configuration option. The operation configuration option includes at least one selected from: a block operation, an un-block operation, a replace operation, or an un-replace operation. The block operation may refer to denying access to an abnormal resource corresponding to the abnormal resource sub-information. Specifically, a blocking capability at a grade of tens of millions may be supported on a cache side, a blocking status recovery statistics capability at a grade of tens of millions may be supported on an API side, and a query and display of the console may be supported according to user needs. By triggering the operation configuration option of the block operation, it is possible to support the blocking of a single abnormal resource. By triggering the operation configuration option of the un-block operation, it is possible to support the un-blocking of a single abnormal resource. A specific blocking period may be determined according to actual business needs and is not limited here. For example, the blocking period may be 30 days.

The replace operation may refer to replacing access to an abnormal resource corresponding to the abnormal resource sub-information. Specifically, the replace operation may refer to replacing a dark industry video with a user-defined video or inserting some contents into the dark-industry video. For example, it is possible to replace the dark-industry video with a new video containing a reporting QR code carousel or add a continuous reporting entrance to the original video, so as to help the user trace to the source and support the user experience based on a reverse reward tracking mechanism.

In an example, each abnormal resource sub-information may be further configured with a preview button. In response to the preview button corresponding to the abnormal resource sub-information being triggered, the abnormal resource details corresponding to the abnormal resource sub-information may be displayed.

In response to a detection that an operation configuration option corresponding to an arbitrary target domain name in the at least one domain name on the abnormal resource management page 701 is triggered, a task configuration information corresponding to the target domain name may be acquired. The user is allowed to autonomously issue a task configuration information of a management task such as blocking, deleting or refreshing the abnormal resource as needed. After the task configuration information corresponding to the arbitrary target domain name is obtained, a task information may be determined according to the task configuration information corresponding to the target domain name.

According to embodiments of the present disclosure, by automatically acquiring the corresponding task configuration information according to the target domain name when the operation configuration option on the abnormal resource management page is triggered, it may be ensured that the abnormal resource under each target domain name may be subsequently processed in a targeted manner based on the task configuration information, which may improve the flexibility and accuracy of abnormal resource management, and help the user to quickly address an abnormal case.

In an example, the abnormal resource sub-information may be further configured with a select box. The select box may be used to perform a select operation on the abnormal resource sub-information. In response to a detection that at least one target select box on the abnormal resource management page 701 is selected, at least one abnormal resource sub-information respectively corresponding to the at least one target select box may be acquired. For example, in a case that a target select box 1 corresponding to an abnormal resource sub-information 1 and a target select box 3 corresponding to an abnormal resource sub-information 3 are selected, the abnormal resource sub-information 1 and the abnormal resource sub-information 3 may be acquired, and each abnormal resource sub-information may include an access date, an abnormal resource address and a blocking status.

The abnormal resource management page 701 may further include a batch operation control. In 700A, the batch operation controls may include a batch blocking control and a batch export control. In response to a detection that the batch operation control is triggered, an abnormal resource mapping may be generated according to the at least one abnormal resource sub-information respectively corresponding to the at least one target select box. For example, the abnormal resource mapping may be generated according to the abnormal resource sub-information 1 and the abnormal resource sub-information 3. By triggering the batch blocking control, it is possible to support the blocking of a plurality of abnormal resources.

By triggering the batch export control, it is possible to support an export of a plurality of abnormal resources. It should be noted that it may be supported to export a predetermined number of abnormal resources every day. The predetermined number may be determined according to actual business needs and is not limited here. For example, the predetermined number may be 10,000. In a case that the number of abnormal resources actually exported is greater than the predetermined number, it is possible to output a prompt information and contact a backend for downloading via a work order.

In an example, before the export operation is performed, the user is further allowed to filter at least one abnormal resource sub-information on the abnormal resource management page 701 according to a filtering condition. The filtering condition may be determined according to actual business needs and is not limited here. For example, the filtering condition may include at least one selected from: a filtering method based on domain name, a filtering method based on access time, or a filtering method based on blocking status, etc.

According to embodiments of the present disclosure, in a case that at least one target select box is selected, the abnormal resource sub-information corresponding to each target select box may be automatically acquired, and in a case that a batch operation control is triggered, an abnormal resource mapping may be generated according to the abnormal resource sub-information corresponding to each target select box, so that the specific situation of each abnormal resource may be clearly understood by the user in subsequent operations. On this basis, by displaying the abnormal resource mapping on the abnormal resource management page, it is possible to help the user to easily view the distribution and detailed information of the abnormal resources, so as to help the user to better understand the abnormal resource situation and facilitate a rapid location and processing of anomalies.

Figure 7B:
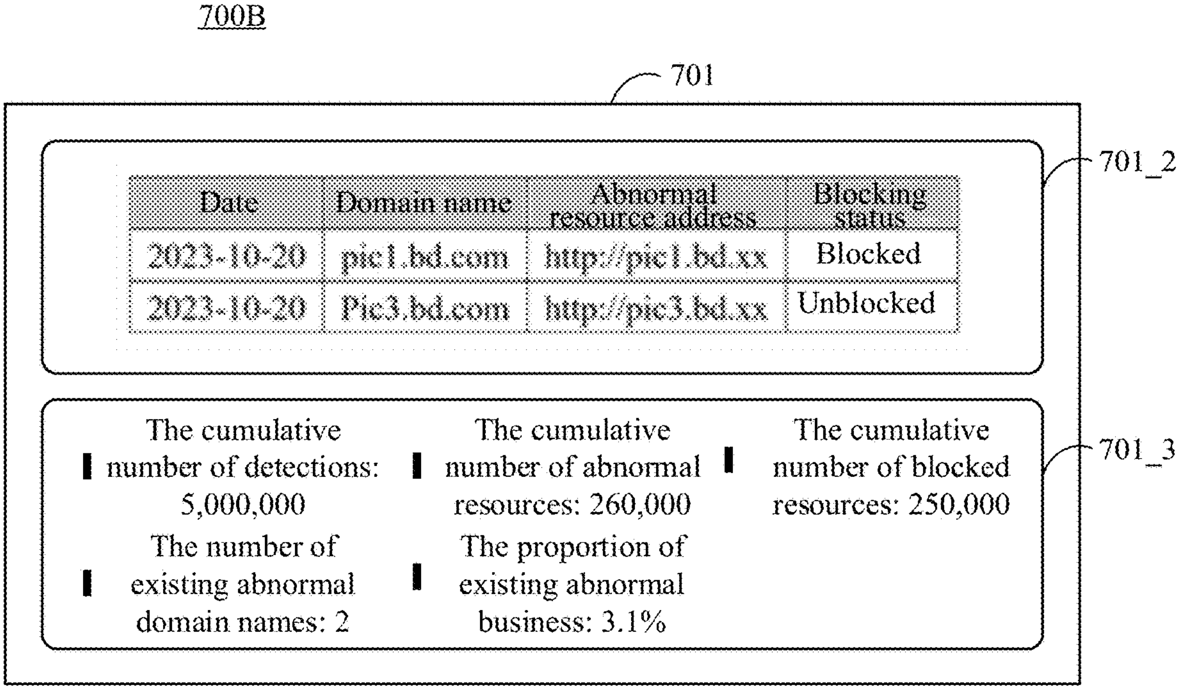
FIG. 7B schematically shows an example schematic diagram of an abnormal resource management page according to embodiments of the present disclosure.

FIG. 7B schematically shows an example schematic diagram of an abnormal resource management page according to embodiments of the present disclosure.

As shown in FIG. 7B, in 700B, the abnormal resource management page 701 may further include an abnormal resource mapping display region 701_2 and a statistical result display region 701_3. The abnormal resource mapping display region 701_2 may be used to display the abnormal resource mapping. The statistical result display region 701_3 may be used to display the statistical result. A positional relationship between the abnormal resource information display region 7011, the abnormal resource mapping display region 701_2 and the statistical result display region 701_3 may be determined according to actual business needs and is not limited here. For example, the abnormal resource information display region 701_1 may be provided on an upper side of the abnormal resource mapping display region 701_2, and the statistical result display region 701_3 may be provided on a lower side of the abnormal resource mapping display region 701_2.

After the abnormal resource information is obtained, statistics may be performed on the abnormal resource information to obtain a statistical result. The statistical result may include at least one selected from: a cumulative number of detections, a cumulative number of abnormal resources, a cumulative number of blocked resources, a number of existing abnormal domain names, and a proportion of existing abnormal business. The cumulative number of detections, the cumulative number of abnormal resources and the cumulative number of blocked resources are actual statistical values. The number of existing abnormal domain names and the proportion of existing abnormal business are predicted and estimated values. For example, in 700B, the cumulative number of detections is 5,000,000, the cumulative number of abnormal resources is 260,000, the cumulative number of blocked resources is 250,000, the number of existing abnormal domain names is 2, and the proportion of existing abnormal business is 3.1%.

According to embodiments of the present disclosure, by performing statistics on the abnormal resource information, the obtained statistical result may comprehensively reflect the abnormal resource situation, which may help the user to comprehensively evaluate the abnormal resource situation from different angles and more comprehensively understand the distribution and trend of abnormal resources. On this basis, by intuitively displaying the statistical result on the abnormal resource management page, the user may easily view the data of various statistical indicators and more intuitively understand the overall situation of abnormal resources, which is conducive to providing reference for subsequent abnormal resource processing decisions.

Figure 8:
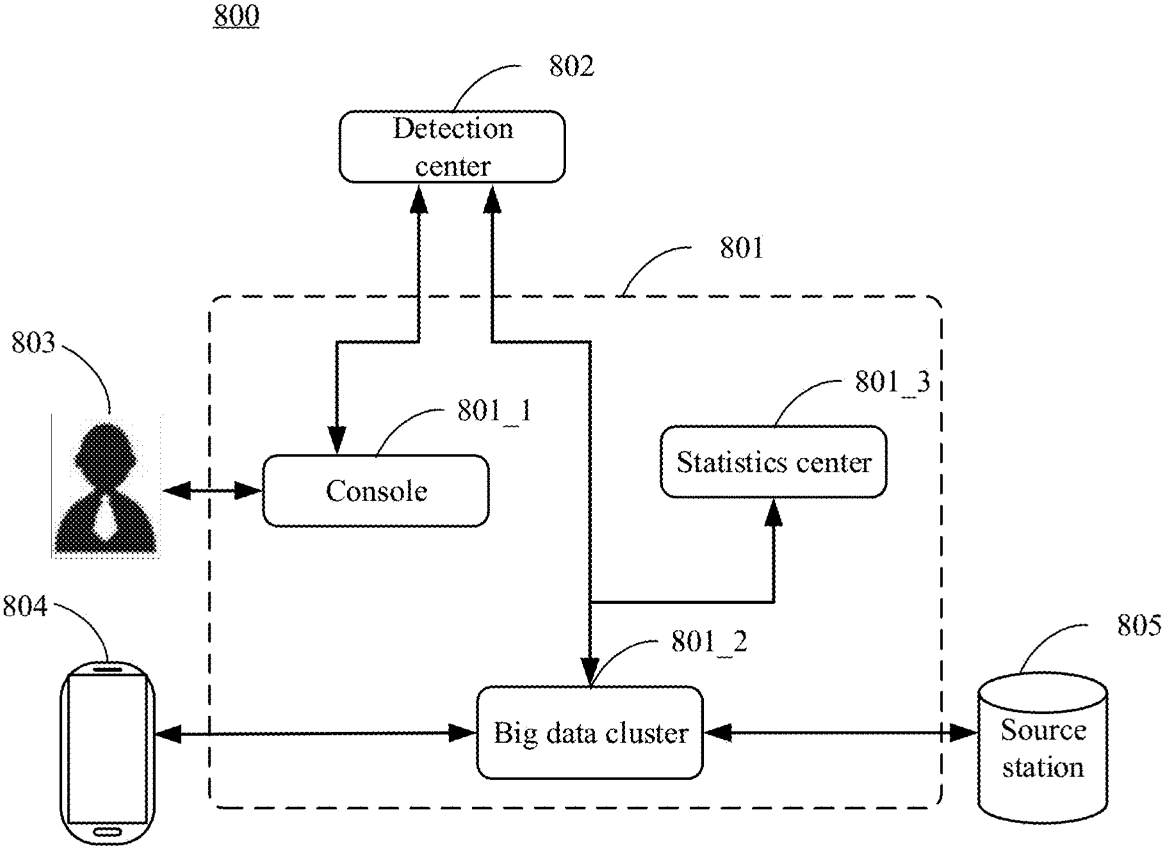
FIG. 8 schematically shows an example schematic diagram of a content delivery network-oriented system of displaying an information according to embodiments of the present disclosure.

FIG. 8 schematically shows an example schematic diagram of a content delivery network-oriented system of displaying an information according to embodiments of the present disclosure.

As shown in FIG. 8, in 800, a content delivery network-oriented system of displaying an information may include a content delivery network 801 and a detection center 802.

The content delivery network 801 may include a console 8011, a big data cluster 801_2, and a statistical center 801_3. A user 803 is allowed to interact with the console 801_1, a client 804 may interact with the big data cluster 801_2, and the big data cluster 801_2 may interact with a source station 805.

The big data cluster 801_2 may be provided with at least one service node, and each service node corresponds to a node identifier. After a task information is obtained, an abnormal resource information to be processed may be sent to the target node in the big data cluster 801_2 according to each of the at least one target node identifier in the task information, so that the target node may process the abnormal resource according to the abnormal resource information to be processed to obtain a processing sub-result corresponding to the target node identifier, thereby completing the management of abnormal content.

According to embodiments of the present disclosure, the processing sub-result is obtained by processing the abnormal resource according to the abnormal resource information to be processed by using the target node corresponding to the target node identifier, which may help to improve the accuracy of the content delivery network in processing the abnormal resource. On this basis, displaying the processing sub-result corresponding to each target node identifier on the abnormal resource management page may help improve the efficiency and transparency of processing the abnormal resource in the content delivery network, so that the management of abnormal resource is more effective and controllable. By integrating the full-chain capability of monitoring, analyzing and processing abnormal resources, it is conducive to enhancing a business security experience of the content delivery network per se.

Figure 9:
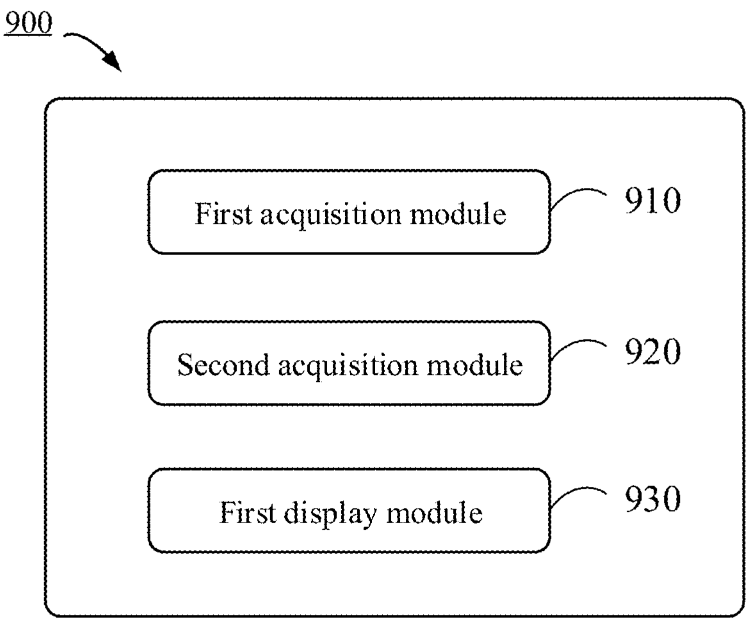
FIG. 9 schematically shows a block diagram of a content delivery network-oriented apparatus of displaying an information according to embodiments of the present disclosure.

FIG. 9 schematically shows a block diagram of a content delivery network-oriented apparatus of displaying an information according to embodiments of the present disclosure.

As shown in FIG. 9, a content delivery network-oriented apparatus 900 of displaying an information may include a first acquisition module 910, a second acquisition module 920, and a first display module 930.

The first acquisition module 910 is used to acquire a business configuration information in response to a detection that a configuration control on a display page is triggered. The business configuration information includes a business domain name and a configuration parameter.

The second acquisition module 920 is used to acquire a task information in response to an operation for an abnormal resource information being detected. The abnormal resource information is determined according to the business domain name and the configuration parameter.

The first display module 930 is used to display a processing result for the abnormal resource information according to the task information.

According to embodiments of the present disclosure, the abnormal resource information includes at least one abnormal resource sub-information respectively corresponding to at least one domain name, and the abnormal resource sub-information is configured with an operation configuration option.

According to embodiments of the present disclosure, the second acquisition module 920 may include a first acquisition unit and a determination unit.

The first acquisition unit is used to acquire, in response to a detection that an operation configuration option corresponding to a target domain name in the at least one domain name on an abnormal resource management page is triggered, a task configuration information corresponding to the target domain name. The operation configuration option includes at least one selected from: a block operation, an un-block operation, a replace operation, or an un-replace operation.

The determination unit is used to determine the task information according to the task configuration information corresponding to the target domain name.

According to embodiments of the present disclosure, the abnormal resource management page further includes a batch operation control, and the abnormal resource sub-information is further configured with a select box.

According to embodiments of the present disclosure, the content delivery network-oriented apparatus 900 of displaying the information may further include a third acquisition module, a generation module, and a second display module.

The third acquisition module is used to acquire, in response to a detection that at least one target select box is selected, at least one abnormal resource sub-information respectively corresponding to the at least one target select box.

The generation module is used to generate, in response to a detection that the batch operation control is triggered, an abnormal resource mapping according to the at least one abnormal resource sub-information respectively corresponding to the at least one target select box.

The second display module is used to display the abnormal resource mapping on the abnormal resource management page.

According to embodiments of the present disclosure, the task information includes at least one target node identifier and abnormal resource information to be processed respectively corresponding to each target node identifier, and the method is applicable to a content delivery network provided with at least one service node.

According to embodiments of the present disclosure, the first display module 930 may include a sending unit, a receiving unit, and a first display unit.

The sending unit is used to, for each of the at least one target node identifier, send the abnormal resource information to be processed to a target node in the content delivery network according to the target node identifier, so that the target node processes an abnormal resource according to the abnormal resource information to be processed to obtain a processing sub-result corresponding to the target node identifier.

The receiving unit is used to receive a processing sub-result corresponding to the target node identifier.

The first display unit is used to display the processing sub-result corresponding to the target node identifier on the abnormal resource management page.

According to embodiments of the present disclosure, the content delivery network-oriented apparatus 900 of displaying the information may further include a third display module and a fourth display module.

The third display module is used to display a registration page in response to a detection that a registration control of the display page is triggered.

The fourth display module is used to display the configuration control on the display page in response to a detection that a registration information entered on the registration page has passed verification.

According to embodiments of the present disclosure, the first acquisition module 910 may include a second display unit and a second acquisition unit.

The second display unit is used to display a configuration page in response to a detection that the configuration control is triggered. The configuration page includes at least one configuration option, the configuration option includes at least one of a domain name configuration option or a parameter configuration option, and the parameter configuration option includes at least one of a function parameter configuration option or a threshold parameter configuration option.

The second acquisition unit is used to acquire the business configuration information in response to a configuration information adding operation for a configuration option of the at least one configuration option being detected.

According to embodiments of the present disclosure, the content delivery network-oriented apparatus 900 of displaying the information may further include a fourth acquisition module, a detection module, and a fifth display module.

The fourth acquisition module is used to acquire a log to be detected and a resource to be detected according to the business domain name and the configuration parameter.

The detection module is used to detect the log to be detected and the resource to be detected to obtain the abnormal resource information.

The fifth display module is used to display the abnormal resource information on an abnormal resource management page.

According to embodiments of the present disclosure, the content delivery network-oriented apparatus 900 of displaying the information may further include a statistics module and a sixth display module.

The statistics module is used to perform statistics on the abnormal resource information to obtain a statistical result.

The sixth display module is used to display the statistical result on the abnormal resource management page.

According to embodiments of the present disclosure, the statistical result includes at least one of a cumulative number of detections, a cumulative number of abnormal resources, a cumulative number of blocked resources, a number of existing abnormal domain names, or a proportion of existing abnormal business.

Figure 10:
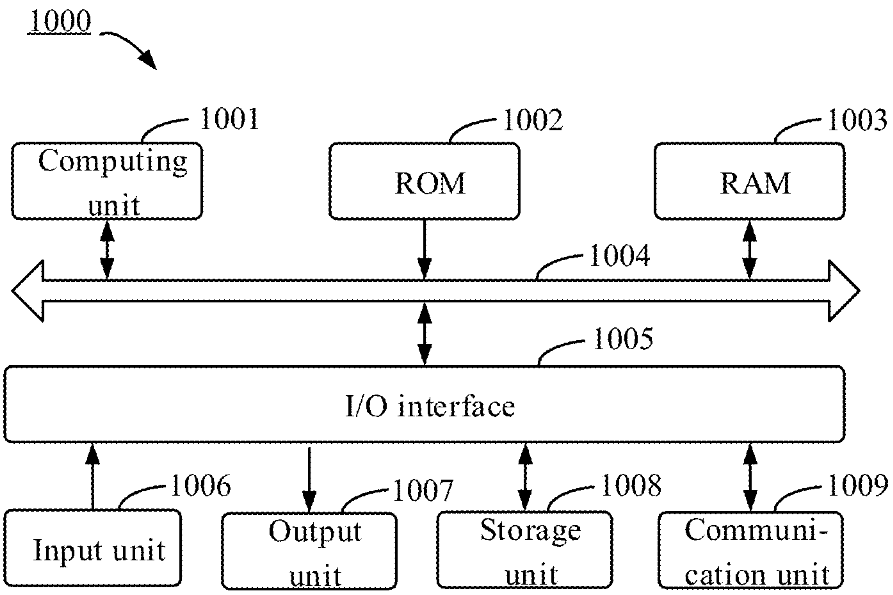
FIG. 10 schematically shows a block diagram of an electronic device suitable for implementing a content delivery network-oriented method of displaying an information according to embodiments of the present disclosure.

FIG. 10 schematically shows a block diagram of an electronic device suitable for implementing a content delivery network-oriented method of displaying an information according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the content delivery network-oriented method of displaying the information. For example, in some embodiments, the content delivery network-oriented method of displaying the information may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the content delivery network-oriented method of displaying the information described above. Alternatively, in other embodiments, the computing unit 1001 may be used to perform the content delivery network-oriented method of displaying the information by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device.

The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of displaying an information, applicable to a content delivery network, the method comprising:

displaying a configuration page in response to a detection that a configuration control on a display page is triggered, to acquire a business configuration information input by a user in the configuration page, wherein the configuration page comprises at least one selected from: a domain name configuration option or a parameter configuration option, the business configuration information comprises a business domain name and a configuration parameter, the domain name configuration option is used for the user to perform a configuration information adding operation to input the business domain name, and the parameter configuration option is used for the user to perform a configuration information adding operation to input the configuration parameter;

acquiring a task information in response to an operation for an abnormal resource information being detected, wherein the abnormal resource information is resource information maliciously occupying the content delivery network, and is determined according to the business domain name and the configuration parameter, wherein the abnormal resource information comprises at least one abnormal resource sub-information respectively corresponding to at least one domain name, each abnormal resource sub-information is configured with an operation configuration option, and the operation configuration option is used to configure a type of management operation for the abnormal resource sub-information; and displaying a processing result for the abnormal resource information according to the task information, wherein the acquiring a task information in response to an operation for an abnormal resource information being detected comprises:

acquiring, in response to a detection that an operation configuration option corresponding to a target domain name in the at least one domain name on an abnormal resource management page is triggered, a task configuration information corresponding to the target domain name, wherein the operation configuration option comprises at least one selected from: a block operation, an un-block operation, a replace operation, or an un-replace operation; and determining the task information according to the task configuration information corresponding to the target domain name.

2. The method according to claim 1, wherein the abnormal resource management page further comprises a batch operation control, and each abnormal resource sub-information is further configured with a select box; and wherein the method further comprises:

acquiring, in response to a detection that at least one target select box is selected, at least one abnormal resource sub-information respectively corresponding to the at least one target select box;

generating, in response to a detection that the batch operation control is triggered, an abnormal resource mapping according to the at least one abnormal resource sub-information respectively corresponding to the at least one target select box; and displaying the abnormal resource mapping on the abnormal resource management page.

3. The method according to claim 1, wherein the task information comprises at least one target node identifier and abnormal resource information to be processed respectively corresponding to each target node identifier, and the content delivery network is provided with at least one service node; and wherein the displaying a processing result for the abnormal resource information according to the task information comprises:

for each of the at least one target node identifier, sending the abnormal resource information to be processed to a target node in the content delivery network according to the target node identifier, so that the target node processes an abnormal resource according to the abnormal resource information to be processed to obtain a processing sub-result corresponding to the target node identifier;

receiving a processing sub-result corresponding to each target node identifier; and displaying the processing sub-result corresponding to each target node identifier on the abnormal resource management page.

4. The method according to claim 1, further comprising:

before acquiring the business configuration information, displaying a registration page in response to a detection that a registration control of the display page is triggered; and displaying the configuration control on the display page in response to a detection that a registration information entered on the registration page has passed verification.

5. The method according to claim 4, wherein the displaying a configuration page in response to a detection that a configuration control on a display page is triggered, to acquire a business configuration information input by a user in the configuration page comprise acquiring the business configuration information in response to a configuration information adding operation for a configuration option of the at least one configuration option being detected, wherein the parameter configuration option comprises at least one selected from: a function parameter configuration option or a threshold parameter configuration option.

6. The method according to claim 1, further comprising:

before acquiring the task information in response to the operation for the abnormal resource information being detected, acquiring a log to be detected and a resource to be detected according to the business domain name and the configuration parameter;

detecting the log to be detected and the resource to be detected to obtain the abnormal resource information; and displaying the abnormal resource information on an abnormal resource management page.

7. The method according to claim 6, further comprising:

performing statistics on the abnormal resource information to obtain a statistical result; and displaying the statistical result on the abnormal resource management page;

wherein the statistical result comprises at least one of a cumulative number of detections, a cumulative number of abnormal resources, a cumulative number of blocked resources, a number of existing abnormal domain names, or a proportion of existing abnormal business.

8. An electronic device, comprising:

at least one processor; and a memory communicatively connected to the at least one processor, wherein the memory stores instructions executable by the at least one processor, and the instructions, when executed by the at least one processor, are configured to cause, applicable to a content delivery network, the at least one processor to at least:

display a configuration page in response to a detection that a configuration control on a display page is triggered, to acquire a business configuration information, wherein the configuration page comprises at least one selected from: a domain name configuration option or a parameter configuration option, the business configuration information comprises a business domain name and a configuration parameter, the domain name configuration option is used for the user to perform a configuration information adding operation to input the business domain name, and the parameter configuration option is used for the user to perform a configuration information adding operation to input the configuration parameter;

acquire a task information in response to an operation for an abnormal resource information being detected, wherein the abnormal resource information is resource information maliciously occupying the content delivery network, and is determined according to the business domain name and the configuration parameter, wherein the abnormal resource information comprises at least one abnormal resource sub-information respectively corresponding to at least one domain name, each abnormal resource sub-information is configured with an operation configuration option, and the operation configuration option is used to configure a type of management operation for the abnormal resource sub-information; and display a processing result for the abnormal resource information according to the task information, wherein the acquisition of a task information in response to an operation for an abnormal resource information being detected comprises:

acquisition, in response to a detection that an operation configuration option corresponding to a target domain name in the at least one domain name on an abnormal resource management page is triggered, a task configuration information corresponding to the target domain name, wherein the operation configuration option comprises at least one selected from: a block operation, an un-block operation, a replace operation, or an un-replace operation; and determination of the task information according to the task configuration information corresponding to the target domain name.

9. The electronic device according to claim 8, wherein the abnormal resource management page further comprises a batch operation control, and each abnormal resource sub-information is further configured with a select box; and wherein the at least one processor is further configured to:

acquire, in response to a detection that at least one target select box is selected, at least one abnormal resource sub-information respectively corresponding to the at least one target select box;

generate, in response to a detection that the batch operation control is triggered, an abnormal resource mapping according to the at least one abnormal resource sub-information respectively corresponding to the at least one target select box; and display the abnormal resource mapping on the abnormal resource management page.

10. The electronic device according to claim 8, wherein the task information comprises at least one target node identifier and abnormal resource information to be processed respectively corresponding to each target node identifier, and the content delivery network is provided with at least one service node; and wherein the at least one processor is further configured to: for each of the at least one target node identifier, send the abnormal resource information to be processed to a target node in the content delivery network according to the target node identifier, so that the target node processes an abnormal resource according to the abnormal resource information to be processed to obtain a processing sub-result corresponding to the target node identifier;

receive a processing sub-result corresponding to each target node identifier; and display the processing sub-result corresponding to each target node identifier on the abnormal resource management page.

11. The electronic device according to claim 8, wherein the at least one processor is further configured to: before acquisition of the business configuration information, display a registration page in response to a detection that a registration control of the display page is triggered; and display the configuration control on the display page in response to a detection that a registration information entered on the registration page has passed verification.

12. The electronic device according to claim 11, wherein the at least one processor is further configured to acquire the business configuration information in response to a configuration information adding operation for a configuration option of the at least one configuration option being detected, wherein the parameter configuration option comprises at least one selected from: a function parameter configuration option or a threshold parameter configuration option.

13. The electronic device according to claim 8, wherein the at least one processor is further configured to: before acquisition of the task information in response to the operation for the abnormal resource information being detected, acquire a log to be detected and a resource to be detected according to the business domain name and the configuration parameter;

detect the log to be detected and the resource to be detected to obtain the abnormal resource information; and display the abnormal resource information on an abnormal resource management page.

14. The electronic device according to claim 13, wherein the at least one processor is further configured to:

perform statistics on the abnormal resource information to obtain a statistical result; and display the statistical result on the abnormal resource management page;

wherein the statistical result comprises at least one of a cumulative number of detections, a cumulative number of abnormal resources, a cumulative number of blocked resources, a number of existing abnormal domain names, or a proportion of existing abnormal business.

15. A non-transitory computer-readable storage medium having computer instructions therein, wherein the computer instructions when executed by at least one processor, are configured to cause, applicable to a content delivery network, the at least one processor to at least:

display a configuration page in response to a detection that a configuration control on a display page is triggered, to acquire a business configuration information, wherein the configuration page comprises at least one selected from: a domain name configuration option or a parameter configuration option, the business configuration information comprises a business domain name and a configuration parameter, the domain name configuration option is used for the user to perform a configuration information adding operation to input the business domain name, and the parameter configuration option is used for the user to perform a configuration information adding operation to input the configuration parameter;

acquire a task information in response to an operation for an abnormal resource information being detected, wherein the abnormal resource information is resource information maliciously occupying the content delivery network, and is determined according to the business domain name and the configuration parameter, wherein the abnormal resource information comprises at least one abnormal resource sub-information respectively corresponding to at least one domain name, each abnormal resource sub-information is configured with an operation configuration option, and the operation configuration option is used to configure a type of management operation for the abnormal resource sub-information; and display a processing result for the abnormal resource information according to the task information, wherein the acquisition of a task information in response to an operation for an abnormal resource information being detected comprises:

acquisition, in response to a detection that an operation configuration option corresponding to a target domain name in the at least one domain name on an abnormal resource management page is triggered, a task configuration information corresponding to the target domain name, wherein the operation configuration option comprises at least one selected from: a block operation, an un-block operation, a replace operation, or an un-replace operation; and determination of the task information according to the task configuration information corresponding to the target domain name.

16. The non-transitory computer-readable storage medium according to claim 15, wherein the abnormal resource management page further comprises a batch operation control, and each abnormal resource sub-information is further configured with a select box; and wherein the computer instructions are further configured to cause the at least one processor computer to:

acquire, in response to a detection that at least one target select box is selected, at least one abnormal resource sub-information respectively corresponding to the at least one target select box;

generate, in response to a detection that the batch operation control is triggered, an abnormal resource mapping according to the at least one abnormal resource sub-information respectively corresponding to the at least one target select box; and display the abnormal resource mapping on the abnormal resource management page.

17. The non-transitory computer-readable storage medium according to claim 15, wherein the task information comprises at least one target node identifier and abnormal resource information to be processed respectively corresponding to each target node identifier, and the content delivery network is provided with at least one service node; and wherein the computer instructions are further configured to cause the at least one processor to:

for each of the at least one target node identifier, send the abnormal resource information to be processed to a target node in the content delivery network according to the target node identifier, so that the target node processes an abnormal resource according to the abnormal resource information to be processed to obtain a processing sub-result corresponding to the target node identifier;

receive a processing sub-result corresponding to the target node identifier; and display the processing sub-result corresponding to the target node identifier on the abnormal resource management page.

18. The non-transitory computer-readable storage medium according to claim 15, wherein the instructions are further configured to cause the at least one processor to: before acquisition of the business configuration information, display a registration page in response to a detection that a registration control of the display page is triggered; and display the configuration control on the display page in response to a detection that a registration information entered on the registration page has passed verification.

19. The non-transitory computer-readable storage medium according to claim 18, wherein the instructions are further configured to cause the at least one processor to acquire the business configuration information in response to a configuration information adding operation for a configuration option of the at least one configuration option being detected, wherein the parameter configuration option comprises at least one selected from: a function parameter configuration option or a threshold parameter configuration option.

20. The non-transitory computer-readable storage medium according to claim 15, wherein the instructions are further configured to cause the at least one processor to: before acquisition of the task information in response to the operation for the abnormal resource information being detected, acquire a log to be detected and a resource to be detected according to the business domain name and the configuration parameter;

detect the log to be detected and the resource to be detected to obtain the abnormal resource information; and display the abnormal resource information on an abnormal resource management page.

* * * * *